May 22, 1956   S. L. ADELSON   2,746,474
DEVICE FOR OBTAINING A CONTROLLED AIR PRESSURE DIRECTLY
PROPORTIONAL TO THE SUM OF A PLURALITY OF PRESSURES
Filed Nov. 8, 1954   2 Sheets-Sheet 1

INVENTOR.

BY

INVENTOR.

BY

United States Patent Office 2,746,474
Patented May 22, 1956

2,746,474

DEVICE FOR OBTAINING A CONTROLLED AIR PRESSURE DIRECTLY PROPORTIONAL TO THE SUM OF A PLURALITY OF PRESSURES

Samuel L. Adelson, Tucson, Ariz., assignor to Infilco Incorporated, Tucson, Ariz., a corporation of Delaware Application November 8, 1954, Serial No. 467,554

9 Claims. (Cl. 137—85)

This invention relates to a device for obtaining a pressure which is a function of the sum of a plurality of pressures.

It is an object of the invention to provide a device for totalizing a plurality of pressures, and for producing an air pressure proportional to the sum of the plurality of pressures.

Another object of the invention is the provision of a device having means for producing at a remote point a pressure corresponding to the total value of a plurality of variable conditions.

A further object of the invention is to provide a device wherein pressures proportional to the values of a plurality of variable conditions may be additively transmitted to an actuator for producing an air pressure proportional to the total of the variable conditions.

Another object of the invention is to provide a device adapted to receive air pressures from two or more independent sources, and producing an air pressure which is a function of the sum of the independent air pressures.

Other objects of the invention will become apparent from the detailed description and the claims which follow.

The apparatus of my invention is particularly useful in producing an air pressure which is proportional to the sum of a plurality of air pressures, each of the plurality of air pressures being a function of the magnitude of a condition, such as the rate of flow through a conduit. As an example, in a water treating plant it is often desirable to know at any instant the total flow from a number of filters to a clearwell. By inserting a pressure differential creating device, such a venturi tube, in the effluent line of each filter and by using a linear pneumatic converter of the type shown, for example, in Hughes Patent No. 2,520,547, a controlled air pressure is produced which varies directly with the flow. The plurality of controlled air pressures so produced are then transmitted to my summation device and the device produces an air pressure that is a function of the plurality of controlled air pressures and, therefore, of the total flow to the clearwell. The air pressure thus obtained can be used for indicating and recording the sum of the individual flow rates, and can also be applied to do some work.

Although I speak of air pressures, it should be understood that any other gas may be used, and the term "air" will, therefore, be used herein to denote other gases as well as air.

Numerous devices and systems have been used heretofore to sum up or totalize a plurality of variable conditions, but all have had in common the drawback that they are relatively complicated.

My new summation device is simple and inexpensive to construct, has a minimum number of moving parts, has high accuracy and sensitivity over its entire working range, is very compact requiring a minimum amount of space, and can be used readily to produce a pressure proportional to the sum of the values of any desired number of variables.

My invention will be more readily understood by reference to the drawings, which form a part hereof and wherein.

Figure 1:
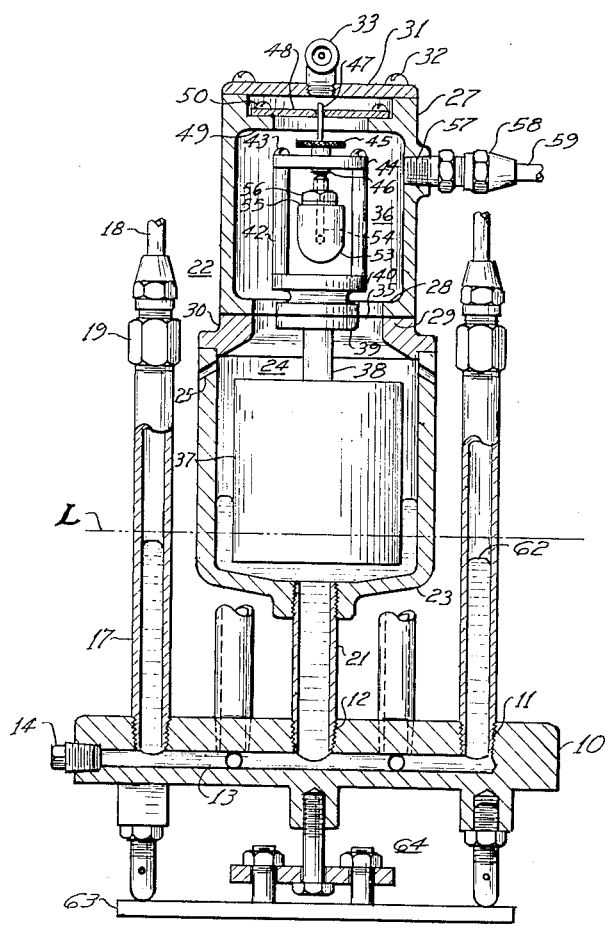
Figure 1 is a vertical sectional view, partly in elevation, of one embodiment of my invention.

In Figure 1 a base 10 is provided with tapped holes 11, along its outer edge, corresponding to the number of variables to be summed up. Centrally located on the base 10 is a tapped hole 12. A passageway 13 located within the base 10 communicates the tapped holes 11 with each other and with the centrally located tapped hole 12. A drain plug 14 permits draining of the passageway 13.

A plurality of tubes 17 of equal cross sectional area are threaded into the tapped holes 11 with one end, while the other end of each tube 17 is connected to a tubing 18 by means of a fitting 19. Each tubing 18 is connected to a source of pressure, not shown. For example, the tubing 18 can be connected to a converter, such as shown in Hughes, Patent No. 2,520,547, which provides a controlled air pressure directly proportional to a condition.

A pipe 21 is threaded into the center tapped hole 12, while the other end is threaded into a housing, generally shown at 22, so that the pipe 21 communicates the inside of the housing 22 with the passageway 13, and also supports the housing 22. The lower portion 23 of the housing 22 forms a float chamber 24, which is connected to atmosphere through an opening 25 near its top.

The upper portion 27 of the housing 22 has a lower flange 28 which is connected by any suitable means, not shown, to a flange 29 which may be integral with the lower portion 23 of the housing 22, or, as shown, be the upper edge of a spacer 30 connected to the lower portion 23. The open top of the upper portion 27 of the housing 22 is closed by means of a cover 31 which is held in place by any suitable means, such as screws 32. The cover 31 is provided with a tapped hole into which is threaded an air escapement fitting 33.

Clamped between the flanges 28 and 29 is a resilient diaphragm 35 that separates the float chamber 24, in the lower portion 23 of the housing 22, from a controlled air pressure chamber 36 in the upper portion 27 of the housing.

A float 37 is affixed to one end of a stem 38. The other end of the stem 38 has an enlarged flange portion 39 which is axially aligned with, and fixed to, the diaphragm 35 by means of a clamping plate 40, so that any movement of the float 37 will produce a corresponding movement of the diaphragm 35, and vice versa. Fixed with one end to the clamping plate 40 are two rods 42, which have fixed to their other ends, by means of screws 43, a crosspiece 44.

A tapped hole is provided in the center of the crosspiece 44, and threaded into it, so as provide vertical adjustment, is a valve member 45. Fixed to the lower end of the valve member 45 is a valve disc 46. The upper end of the valve member 45 passes through a guide hole 47 in a cross bar 48 which is fixed to projections 49 of the upper portion 27 of the housing 22 by means of screws 50.

Figure 3:
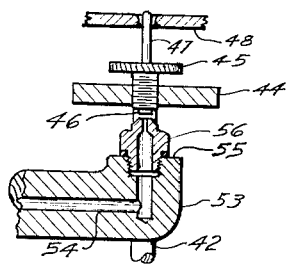
Figure 3 is an enlarged sectional view of the air inlet valve of Figures 1 and 2.

As best shown in Figure 3, a projection 53 of the upper portion 27 of the housing 22 extends into the air chamber 36, between the rods 42, and is drilled to form an air conduit 54 from outside the housing 22 to the center of the air chamber where it turns upward. The upper face 55 of the projection 53 is provided with a tapped hole coaxially aligned with the air conduit 54 and into which an air nozzle 56 is threaded so that the air conduit 54 communicates with the controlled air pressure chamber 36 through the air nozzle 56. The air conduit 54 is connected to a source of air under pressure, not shown. The air pressure chamber 36 is provided with an outlet port 57, which is connected by a fitting 58 to a controlled air pressure line 59. The line 59 may be connected to a gauge, recorder, or other device, not shown.

The float chamber 24 in the lower portion of the housing 22 and the tubes 17 are filled with a manometric fluid, such as mercury 62, to a zero level L. When the mercury level is at the zero position in float chamber 24, the buoyant effect of the mercury 62 balances the weight of the float 37 and the parts carried by it. To insure that the device is level at all times, so that the mercury 62 in the tubes 17 and the float chamber 24 is also level, it is provided with a sub base 63, upon which it is leveled by means of a leveling assembly, generally shown at 64.

In order to understand the operation of my invention, assume that the area of the tubes 17 is "$a$" square inches, that $p_1$, $p_2$, $p_3$, and $p_4$ are the pressures transmitted to these tubes, and that "$w$," "$x$," "$y$," and "$z$" are the changes in the mercury level in the tubes 17 due to the pressures $p_1$, $p_2$, $p_3$, and $p_4$. Also, assume that "$A$" is the area of the annular ring between the float 37 and the lower portion 23 of housing 22, and that "$H$" is the rise in the mercury level in float chamber 24 due to the pressures $p_1$, $p_2$, $p_3$, and $p_4$. It will then be clear that:

$$(w+x+y+z)a = HA \text{ or } w+x+y+z = \frac{HA}{a}$$

and also $$p_1 = K(H+w) \text{ or } w = \frac{p_1}{K} - H$$

$$p_2 = K(H+x) \text{ or } x = \frac{p_2}{K} - H$$

$$p_3 = K(H+y) \text{ or } y = \frac{p_3}{K} - H$$

$$p_4 = K(H+z) \text{ or } z = \frac{p_4}{K} - H$$

wherein $K$ is the density of the manometric liquid used, which in this example is mercury. By adding together the above equations, it will be seen that:

$$\frac{p_1}{K} - H + \frac{p_2}{K} - H + \frac{p_3}{K} - H + \frac{p_4}{K} - H = \frac{HA}{a}$$

or $$p_1 + p_2 + p_3 + p_4 = \left[\frac{HA}{a} + 4H\right]K = KH\left[\frac{A}{a} + 4\right] \quad (1)$$

from which it will be understood that $H$, the rise in mercury level in the float chamber 24, is directly proportional to the sum of the pressures in the individual tubes 17.

As further proof, assume that the area of float 37 is $B_1$. Then the buoyant effect on the float due to the rise in mercury $H$ is $B_1HK$. Also, if $B_2$ is the effective area of the diaphragm 35 and $P$ is the pressure in the controlled air pressure chamber 36, at equilibrium.

$$PB_2 = B_1HK$$

from which $$H = \frac{PB_2}{B_1K}$$

and by substituting the value of $H$ in Equation 1

$$p_1 + p_2 + p_3 + p_4 = \frac{PB_2}{B_1}\left[\frac{A}{a} + 4\right] \quad (2)$$

It will be seen that $P$ is proportional to the sum of the pressures in the individual tubes 17.

In the zero position of the device atmospheric pressure prevails both in the tubes 17 and the float chamber 24, and with the buoyant effect of the mercury balancing the weight of the float 37 and the parts carried by it, the air inlet nozzle 56 is closed by the valve disc 46 and atmospheric pressure will prevail also in the controlled air pressure chamber 36 due to its connection to atmosphere through escapement fitting 33.

When pressures are applied to the tubes 17, each pressure corresponding to the value of a condition, such as the flow through a conduit, the mercury in response to these pressures will be depressed in the tubes 17 and the mercury level will rise in the float chamber 24. The additional buoyant effect of the mercury on the float 37 exerts an upward force on the diaphragm 35, and by way of the rods 42 and the crosspiece 44 lifts the valve disc 46 away from the air nozzle 56. This increases the air flow from the nozzle 56 and builds up the pressure in the chamber 36, escapement fitting 33 being too small to permit escape of more than an insignificant quantity of air. It will thus be seen that the mercury constitutes a pressure responsive means which receives the sum of the pressures prevailing in the several tubes 17 and by its movement positions the air inlet valve member 45 by means of the float 37.

This increased air pressure acts immediately on the diaphragm 35 to counteract the thrust of the float 37, due to the rise in the mercury in the float chamber. When the air pressure in chamber 36 acting on diaphragm 35 equals the thrust of the float, the system is again in equilibrium. The pressure then existing in the controlled air pressure chamber 36 is proportional to the sum of the air pressures applied to the tubes 17; it is transmitted through the air line 59 to an indicating or recording instrument, and may be utilized to perform some work.

Assuming, for example, that the range of controlled air pressure in the tubes is 0 to 3 p. s. i. (pound per square inch) for a range of flow from 0 to 150 percent, then it will be readily seen from equation number two (2) that by varying the relation between the area of the float $B_1$ and the effective area of the diaphragm $B_2$ it is possible to work with any desired range of controlled air pressures in chamber 36, and each individual air pressure value in chamber 36 will still be proportional to the sum of the pressures in the tubes 17.

Figure 2:
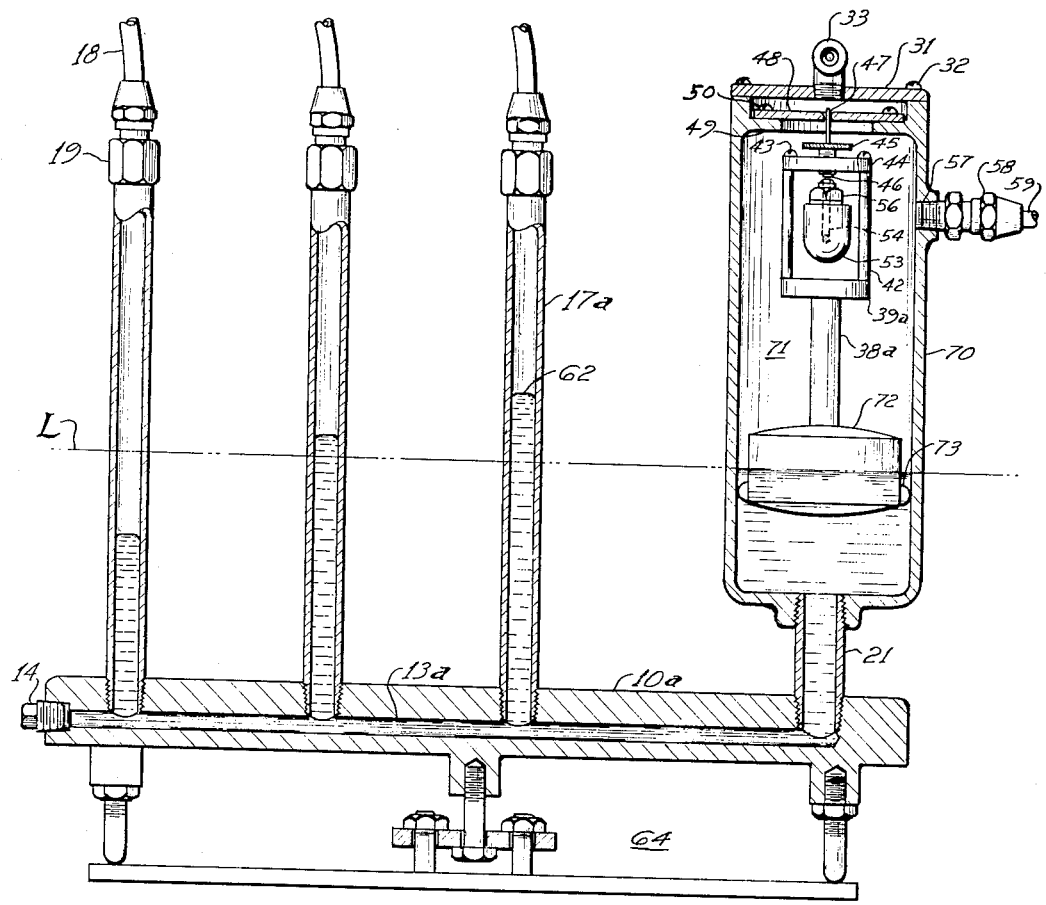
Figure 2 is a vertical sectional view, partly in elevation, of another embodiment of my invention.

Referring now to Figure 2, in this embodiment the tubes 17a are shown for purposes of illustration to one side of the pipe 21 which supports the housing 70, but obviously, they could be arranged in the manner shown in Figure 1. The tubes 17a and pipe 21 are threaded in holes tapped in a longitudinal base 10a provided with a drilled passageway 13a extending lengthwise through the base. While only three tubes 17a are shown, any number of tubes can be used, depending on the number of variables to be summed up. The tubes 17a are provided with fittings 19, which connect them to tubing 18 which lead to a source of pressures, not shown, the same as described in connection with Figure 1.

The housing 70 communicates with the passageway 13a through the pipe 21. An air escapement fitting 33 is threaded into a tapped hole in the cover 31. The housing 70 forms a unitary controlled air pressure and float chamber 71. The chamber 71 is provided with an outlet port 57, which is connected by a fitting 58 to a controlled air pressure line 59.

As in Figure 1, the device is leveled by means of a leveling assembly 64. The chamber 71 and the tubes 17a are filled with mercury 62 to a zero level L. A float 72 rides in the mercury 62 in the chamber 71 and is provided with knobs 73 that guide the float 72 with respect to the inner wall of the housing 70. A stem 38a, which may be integral with the float 72 or otherwise affixed to it, has an enlarged flange portion 39a at its upper end.

Fixed with one end to the enlarged flange portion 39a of the stem 38a are two rods 42, which carry at their other end a crosspiece 44 that is fixed to the rods by means of screws 43.

The rods 42, the crosspiece 44, the valve member 45, the valve disc 46, the cross bar 48 with its guide hole 47, the projection 53 within which the air conduit 54 is formed, and the air nozzle 56 are identical to the corresponding parts shown in Figure 1 and will, therefore, not be further described. Also, as in Figure 1, the tubes 17a, as shown, are of equal cross sectional area. In this embodiment, however, the relative size of the areas of the annular ring around the float and of the tubes does not influence the summation as it does in Figure 1.

In order to understand the operation of this embodiment of the invention, assume that there are $n$ tubes 17a and that $p_1, p_2, p_3 \ldots p_n$ are the pressures in the tubes 17a as they are transmitted from their corresponding converters. Assume further that $|d_1|, |d_2|, |d_3| \ldots |d_n|$ are the absolute values of the changes in the mercury level in the tubes due to the pressures $p_1, p_2, p_3 \ldots p_n$, respectively, and that changes of the mercury level to below the zero line L shall be considered positive (+) and that changes of the mercury level to above the zero line L shall be considered negative (—).

As will be shown later in the description of the operation of this embodiment, the mercury level in chamber 71 remains substantially constant. Upon this assumption it is evident that the volume of mercury which leaves the tubes because of a lowering of the level therein must equal the volume entering the tubes in which the level rises.

Let P be the pressure in the chamber 71. We then have:

$$p_1 = P + K|d_1|$$
$$p_2 = P + K|d_2|$$
$$p_3 = P + K|d_3|$$
$$p_n = P + K|d_n|$$

and $$p_1 + p_2 + p_3 + \ldots + p_n = nP + K[|d_1| + |d_2| + |d_3| + \ldots + |d_n|] \quad (3)$$

The sign of $|d_1|, |d_2|, |d_3| \ldots |d_n|$ will be positive or negative depending upon whether they represent a drop or a rise of the mercury level with respect to the zero line L.

Let the sum of all the positive values be M and the sum of all the negative values by N. Equation 3 may then be written $$p_1 + p_2 + p_3 + \ldots + p_n = nP + K[M - N] \quad (4)$$

Since the sum of such values of $|d_1|, |d_2|, |d_3| \ldots |d_n|$ which are positive must be equal to the sum of such values of $|d_1|, |d_2|, |d_3| \ldots |d_n|$ which are negative $$M = N$$

and, accordingly, Equation 4 becomes $$p_1 + p_2 + p_3 + \ldots + p_n = nP + 0$$

or $$P = \frac{p_1 + p_2 + p_3 + \ldots + p_n}{n} \quad (5)$$

from which is will be seen that the pressure P in chamber 71 is equal to the sum of the pressures in the individual tubes divided by the number of pressures to be included in the total, and that the pressure P is directly proportional to the sum of the individual pressures.

In this embodiment of the invention, therefore, it will be clear that the range of controlled air pressure in the chamber 71 is the same as the range of controlled air pressure in the tubes 17a. This means that the gauge that is used to indicate the sum of the conditions may be identical to the gauges used to indicate the individual conditions, with the exception of the calibration of the dials or scales that are used.

In the zero position of the device atmospheric pressure prevails both in the tubes 17a and the chamber 71, and with the buoyant effect of the mercury 62 balancing the weight of the float 72 and the parts carried by it, the air nozzle 56 is substantially closed by the valve disc 46.

When pressures are applied to the tubes 17a, each pressure corresponding to the value of a condition, such as the flow through a conduit, the mercury in response to these pressures will be depressed in the tubes 17a, and the mercury level will rise in the chamber 71. The additional buoyant effect of the mercury on thhe float 72 exerts an upward force that lifts the valve disc 46 away from the air nozzle 56. This increases the air flow from the nozzle 56 and builds up the pressure in the chamber 71 (escapement fitting 33 being too small to permit escape of more than an insignificant quantity of air) until it attains a value equal to the sum of the individual pressures divided by the number of the individual pressures. This increased controlled air pressure acts directly on the surface of the mercury 62 in the chamber 71, returning it to its neutral level L. Due to the high sensitivity of the device, the movement of the valve disc 46 with respect to the air nozzle may be as small as one or two thousandths of an inch. Therefore, for all practical purposes the mercury level in the chamber 71 may be considered to remain constant. With the mercury level in chamber 71 constant, the mercury levels in the tubes are positioned so that the algebraic sum of the differences between these mercury levels and the level L is equal to zero.

As an example, assume that the pressure in tube 17a, on the left in Figure 2, is 3 p. s. i., that the pressure in the center tube 17a is 1.5 p. s. i., and that the pressure in the tube 17a on the right is .75 p. s. i. Also, assume that 1 p. s. i. is equal to two inches of mercury. It will be seen by Equation 5 that the pressure P in the chamber 71 will be 3+1.5+.75 divided by 3, or 1.75 p. s. i., which is equivalent to 3.5 inches of mercury. Since the 3 p. s. i. in the tube 17a on the left balances 6 inches of mercury and since there is 3.5 inches of mercury in the chamber 71, the mercury in the tube will be depressed 2.5 inches below the level L. Similarly, the 1.5 p. s. i. in the center tube is balanced by 3 inches of mercury, and since there is 3.5 inches in the chamber 71, the mercury level rises in the center tube .5 inch above the level L. The same holds true for the tube on the right, wherein the .75 p. s. i. balances 1.5 inches of mercury and therefore the mercury level in the tube rises 2 inches above the level L.

The controlled air pressure then existing in the chamber 71 is directly proportional to the sum of the pressures in the tubes 17a, and it is transmitted through the air line 59 to a gauge, recorder or other device, not shown.

It will thus be seen that the invention provides an accurate instrument for producing a controlled air pressure that is directly proportional to the sum of a plurality of pressures. With one form of the instrument the controlled air pressure produced can be within the range of a plurality of controlled air pressures applied thereto, and with the other form it can be within any desired range. It will also be obvious to those skilled in the art that many modifications of the summation device coming within the scope and spirit of my invention could be made. Accordingly, I do not wish to limit myself to the exact structural features shown in the drawings for purposes of exemplification but not of limitation.

I claim:

1. A summation device of the type described, comprising a housing, a plurality of tubes, said tubes communicating with said housing, a manometric fluid in said tubes and said housing, means for applying a plurality of pressures to said manometric fluid in said tubes, inlet means for air under pressure into said housing, a valve regulating flow of air through said inlet means, an escapement port leading from said housing, means for transmitting the movement of said manometric fluid to said valve, and a controlled air pressure port leading from said housing adapted to be connected to an instrument.

2. Apparatus for obtaining a controlled air pressure directly proportional to the sum of the values of a plurality of conditions, comprising a housing, inlet means for air under pressure to said housing, a valve regulating flow of air through said inlet means, an escapement port leading from said housing, a controlled air pressure port leading from said housing, a plurality of tubes corresponding in number to said plurality of conditions, a passageway connecting said tubes with said housing, manometric fluid in said tubes, said passageway and said housing, means for applying to the manometric fluid in said tubes pressures varying with the values of said conditions, a float riding in said manometric fluid in said housing, and means connecting said float to said valve and transmitting the movement of said float to said valve.

3. Apparatus for obtaining a controlled pressure directly proportional to the sum of a plurality of controlled pressures that vary directly as the values of a plurality of conditions, comprising a housing having an inlet for air under pressure, a valve regulating flow through said inlet, an air escapement port leading from said housing, a controlled air pressure port leading from said housing, a plurality of tubes corresponding in number to said plurality of conditions and adapted to be connected to the sources of said plurality of controlled pressures, a passageway communicating with said tubes and said housing, a manometric fluid in said tubes, said passageway and said housing, and means for transmitting the movement of the manometric fluid in said housing in response to said controlled pressures acting on the manometric fluid in said tubes to said valve.

4. Apparatus for obtaining a controlled pressure directly proportional to the sum of a plurality of conditions, comprising an air pressure chamber, inlet means for air under pressure to said air pressure chamber, a valve regulating flow through said inlet means, a controlled air pressure port leading from said air pressure chamber, an escapement port leading from said air pressure chamber, a float chamber, manometric fluid in said float chamber, a float riding in said manometric fluid, a flexible wall between said air pressure chamber and said float chamber, means for applying to said manometric fluid a plurality of pressures which vary as the values of said plurality of conditions, and means including said flexible wall for transmitting the movement of said float in response to movement of said manometric fluid to said valve.

5. Apparatus for obtaining a controlled air pressure directly proportional to the sum of a plurality of controlled air pressures, comprising a housing, a flexible diaphragm in said housing separating a first and second chamber, inlet means for air under pressure to said first chamber, a valve regulating the flow of air through said inlet means, an escapement port leading from said first chamber, a controlled air pressure port leading from said first chamber, a plurality of tubes corresponding in number to said plurality of air pressures, a passageway connecting said tubes with said second chamber, manometric fluid in said tubes, said passageway and said second chamber, means for applying said plurality of controlled air pressures to said manometric fluid in said tubes, and means for transmitting the movement of said manometric fluid in said second chamber in response to said controlled air pressures acting on the manometric fluid in said tubes to said valve.

6. Apparatus for obtaining a controlled air pressure directly proportional to the sum of a plurality of pressures that vary directly as the values of a plurality of conditions, comprising a housing forming an air pressure chamber and a float chamber, a flexible wall between said air pressure chamber and said float chamber, inlet means for air under pressure to said air pressure chamber, a valve regulating flow of air through said inlet means, an air escapement port leading from said air pressure chamber, a controlled air pressure port leading from said air pressure chamber, a plurality of tubes corresponding in number to said plurality of conditions, a passageway connecting said tubes with said float chamber, a manometric fluid in said tubes, said passageway and said float chamber, means for applying said plurality of pressures to the manometric fluid in said tubes, a float riding in said manometric fluid in said float chamber and rigidly affixed to said flexible wall, and means for transmitting the movement of said flexible wall to said valve.

7. Apparatus for obtaining a controlled pressure proportional to the sum of a plurality of conditions, comprising a chamber, inlet means for air under pressure to said chamber, a valve regulating flow through said inlet means, a controlled air pressure port leading from said chamber, an escapement port leading from said chamber, manometric fluid in said chamber, means for additively applying to said manometric fluid a plurality of pressures which vary as the values of said plurality of conditions, and means for transmitting the movement of said manometric fluid to said valve.

8. Apparatus for obtaining a controlled air pressure directly proportional to the sum of a plurality of pressures, comprising a housing forming a single chamber, inlet means for air under pressure to said chamber, a valve regulating the flow of air through said inlet means, an escapement port leading from said chamber, a controlled air pressure port leading from said chamber, a plurality of tubes corresponding in number to said plurality of pressures, a passageway connecting said tubes with said chamber, manometric fluid in said tubes, said passageway and said chamber, and means for transmitting the movement of said manometric fluid in said chamber to said valve.

9. Apparatus for obtaining a pressure directly proportional to the sum of the values of a plurality of conditions, comprising a housing free of partitions, inlet means for air under pressure to said housing, a valve regulating the flow of air through said inlet means, an air escapement port leading from said housing, a controlled air pressure port leading from said housing, a plurality of tubes corresponding in number to said plurality of conditions, a passageway connecting said tubes with said housing, a manometric fluid in said tubes, said passageway and said housing, means for applying to the manometric fluid in said tubes pressures varying as the values of said conditions, a float riding in the manometric fluid in said housing, and means for transmitting the movement of said float to said valve.

References Cited in the file of this patent

UNITED STATES PATENTS

| | | |
|---|---|---|
| 1,973,769 | Lehn | Sept. 18, 1934 |
| 2,308,923 | Hartley | Jan. 19, 1943 |
| 2,473,717 | Markson | June 21, 1949 |
| 2,520,547 | Hughes | Aug. 29, 1950 |
| 2,568,506 | Mercer | Sept. 18, 1951 |
| 2,629,460 | Maki | Feb. 24, 1953 |
| 2,659,531 | Thoresen | Nov. 17, 1953 |